United States Patent [19]

Hannigan

[11] 4,223,345
[45] Sep. 16, 1980

[54] METHOD AND APPARATUS FOR CAMOUFLAGE SIGNATURE MEASUREMENT

[75] Inventor: Joseph F. Hannigan, Springfield, Va.

[73] Assignee: The United States of America as represented by the Secretary of the Army, Washington, D.C.

[21] Appl. No.: 50,391

[22] Filed: Jun. 20, 1979

[51] Int. Cl.³ .............................................. H04N 7/18
[52] U.S. Cl. ........................................ 358/93; 358/106; 358/107; 358/108; 358/903; 364/515
[58] Field of Search .................. 358/93, 106, 107, 108, 358/903; 364/515

[56] References Cited

U.S. PATENT DOCUMENTS

| 3,836,712 | 9/1974 | Kornreich | 250/211 R |
|---|---|---|---|
| 3,891,968 | 6/1975 | McMahon | 350/162 SF |
| 3,944,732 | 3/1976 | Kino | 358/93 |
| 3,972,616 | 8/1976 | Minami | 350/162 SF |
| 4,040,091 | 8/1977 | Kornreich | 358/213 |
| 4,040,112 | 8/1977 | Kornreich | 358/213 |
| 4,053,934 | 10/1977 | Kornreich | 358/213 |
| 4,063,281 | 12/1977 | Kornreich | 358/105 |
| 4,065,791 | 12/1977 | Kowel | 358/213 |
| 4,084,192 | 4/1978 | De Franould | 358/213 |
| 4,099,207 | 7/1978 | Kornreich | 358/213 |
| 4,142,212 | 2/1979 | Scott | 358/213 |

Primary Examiner—Howard W. Britton
Attorney, Agent, or Firm—Darrell E. Hollis

[57] ABSTRACT

A method and apparatus for measuring the extent of camouflage applied to a target is disclosed. The apparatus includes a direct electronic Fourier transform device responsive to first and second conditions of camouflage of a target for producing spectra signals of first and second limited Fourier transforms, respectively. Each of the spectra signals has a plurality of amplitude and principal frequency components, and a base clipper circuit is provided for deleting the spectra signal amplitude components below a given value. A radio frequency voltmeter and a first analog-to-digital converter cooperate to produce digital signals corresponding with the magnitude of the amplitude components. Similarly, a radio frequency frequency meter and a second analog-to-digital converter cooperate to produce digital signals corresponding with the principal frequency components. A control device controls the operating sequence of the digital signal producing devices for subsequent spectra signals and a memory stores the first and second digital amplitude and principle frequency signals. The first and second amplitude signals are compared in a comparator, thereby to indicate the difference between the extent of camouflage of the target in the first and second conditions.

8 Claims, 7 Drawing Figures

METHOD AND APPARATUS FOR CAMOUFLAGE SIGNATURE MEASUREMENT

BRIEF DESCRIPTION OF THE PRIOR ART

The direct electronic Fourier transform (DEFT) device is a recent advance in surface acoustic wave technology. As disclosed in the patents to Kornreich et al U.S. Pat. Nos. 3,836,712, 4,040,091, 4,040,112, 4,053,934, 4,063,281, 4,065,791 and 4,099,207, DEFT devices combine acoustics, optics, and electronics to provide the Fourier transform of conventional images in the form of an analog alternating current. In reality, the AC current is a spectrum of radio frequencies (RF), whereby DEFT devices transform conventional two-dimensional images into RF spectra.

As disclosed in the Kornreich et al patent U.S. Pat. No. 4,063,281, DEFT devices may be used in pattern recognition systems which respond to the presence or absence of specific components. While the prior devices normally operate quite satisfactorily, they do possess the inherent drawback of being limited to yes/no types of pattern recognition responses. The prior devices therefore are incapable of making quantitative measurements of spectra amplitude components which are necessary in camouflage measuring techniques.

SUMMARY OF THE INVENTION

Accordingly, it is a primary object of the present invention to provide a method and apparatus for measuring the quantity of shape disruptive and contrast reductive camouflage applied to a target wherein a device responsive to first and second conditions of camouflage of a target produces spectra signals of first and second limited Fourier transforms constituting the signatures of the target, respectively. The spectra signals each have a plurality of amplitude and principal frequency components, the magnitudes of which are processed and converted to digital form for storage in a memory device. The stored digital signals are then compared in a comparison device wherein the amplitude signals from the first camouflage spectra, actually the uncamouflaged condition, and the second camouflage spectra are compared over the frequency range of the spectra, thereby to indicate the difference between the extent of camouflage of the target in the first and second conditions.

It is a further object of the invention to provide a camouflage measuring device wherein the spectra signal producing device comprises a direct electronic Fourier transform device.

According to another object of the invention, the digital processing apparatus comprises a radio frequency voltmeter and a first AD converter for producing the digital amplitude signals from the spectra signals, and a radio frequency frequency meter and a second AD converter for producing the digital principal frequency signals from the spectra signals.

It is yet another object of the invention to provide a camouflage measuring device wherein the comparison device comprises a calculator having a plurality of arithmetic logic units for calculating the extent of camouflage.

According to a more particular object of the invention, a controller is provided for controlling the data flow of the spectra signals from the DEFT device to the digital processing circuitry in order to allow for the completion of processing of previous spectra signals prior to processing subsequent spectra signals.

BRIEF DESCRIPTION OF THE FIGURES

Other objects and advantages of the invention will become apparent from study of the following specification when viewed in the light of the accompanying drawing, in which.

DETAILED DESCRIPTION

Figure 1:
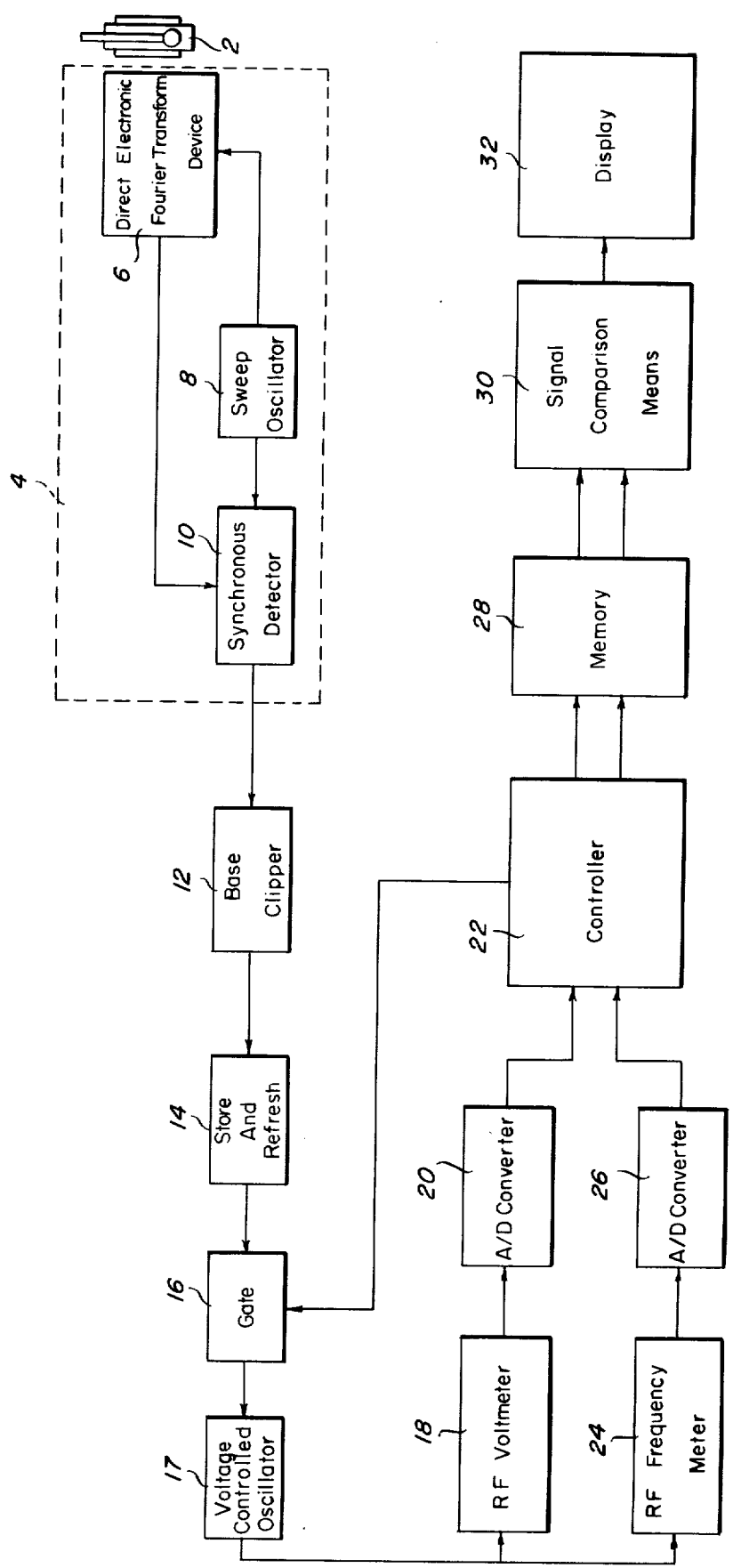
FIG. 1 is a schematic block diagram of the camouflage measuring device.

Referring first more particularly to the block diagram of FIG. 1, the components of the camouflage measuring device are shown. The device is used to measure the extent of camouflage applied to a target 2 such as a tank, gun, ship or the like, having first and second degrees of camouflage. In a preferred embodiment, the first condition is one of no camouflage applied to the target. This condition serves as a reference condition while the second condition is one where an unknown degree of camouflage is applied to the target. The camouflage measuring device compares the two conditions to produce a numerical indication of the extent of camouflage applied to the target in the second condition.

The device includes a spectra producing device 4 for producing spectra signals of first and second limited Fourier transforms, respectively. The device 4 includes a direct electronic Fourier transform (DEFT) device 6 of the type disclosed for example in the aforementioned Kornreich et al U.S. Pat. No. 3,836,712, a sweep oscillator 8, and a synchronous detector 10.

The DEFT device 6 responds to surface acoustic waves (SAW) propagating through the target. The strain induced in a photoconductive material by the SAW causes both temporal and spatial variation in the photoconductance of the material. When the spatial frequency pattern of conductance matches a specific spatial frequency pattern of the target image, there is a high temporal frequency output which corresponds to that specific acoustic frequency. Sweeping the surface acoustic waves over a range of frequencies results in a radio frequency spectrum of the target. The spectrum thus has amplitude and frequency components and constitutes the signature of the target.

The sweep oscillator 8 provides the range of frequencies over which the DEFT device 6 is swept and the corresponding reference frequencies for the synchronous detector 10. Since the spectra output from the DEFT device comprises real RF signals, their amplitudes and frequencies are measured by the synchronous detector 10 to produce the simulated RF specturm shown in FIG. 2. The amplitudes of the RF signals are measured in terms of signal to noise ratio (S/N) in decibels (db).

Figure 2:
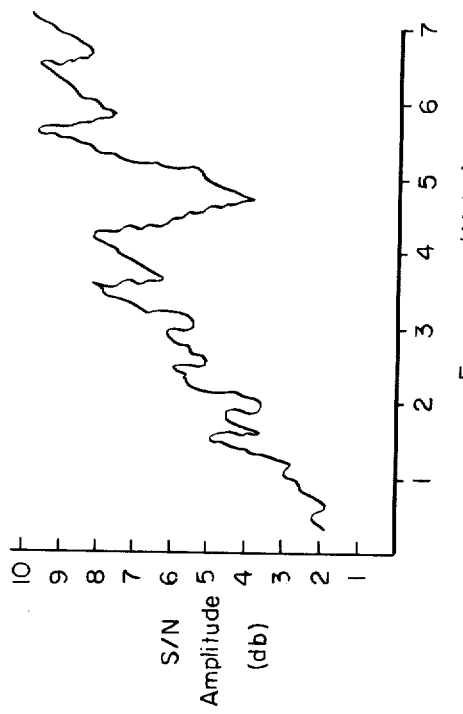
FIG. 2 is a graphical representation of a spectra signal of a target in a first condition of camouflage.

The spectrum frequencies having the greatest amplitudes are considered to be the principal frequencies. In Fourier analysis, the principal frequencies are the most important as far as the function representative of the object is concerned. In order to obtain an accurate representation of the target, the target must be scanned over a range of between 20 and 30 discrete principal frequencies. The spectrum of FIG. 2 is shown in idealized form with discrete principal frequencies in FIG. 3. In the camouflage measuring device, only the principal frequencies from the spectrum are used in the camouflage measuring operation. Therefore, a base clipper circuit 12 is provided to delete those portions of the spectra output below a given value. Thus, for example, it may be that a S/N ratio or a change in S/N ratio of 5 db or greater may be the optimum criteria for analyzing the spectrum at the principal frequencies. The base clipper circuit 12 would therefore delete those portions of the spectra output below 5 db as shown in FIG. 4.

The signals representing the spectra output of the DEFT device are in analog form. A store and refresh device 14 works in conjunction with sweep oscillator 8 and synchronous detector 10 to digitize and store voltage values representative of the analog signals. These representative values are used to control a voltage controlled oscillator (VCO) 17 with variable gain control, which provides inputs to a radio frequency voltmeter 18 and a radio frequency frequency meter 24. The rate at which these values are applied to the VCO are controlled by gate 16.

The radio frequency voltmeter 18 measures the amplitude components of each principal frequency of the spectra output. The analog amplitude signals are converted to digital signals by a first analog-to-digital converter 20 whose output is delivered to a controller 22 which will be discussed in greater detail below. Similarly, the radio frequency frequency meter 24 measures the principal frequency components of the spectra output, and the analog frequency signals are converted to digital signals by a second analog-to-digital converter 26 whose output is also connected to the controller 22.

The controller 22 primarily controls the flow of signals through the camouflage measuring device. Thus the controller sorts and combines the appropriate digital signals representing the amplitude and frequency components of the selected sampled discrete frequencies from the range of frequencies over which the target was swept. After the amplitude and frequency components from the previous discrete frequency have been digitized, the controller 22 resets the gate 16 to deliver the amplitude and frequency components from the next successive discrete frequency to be digitized. Digital processing of amplitude and frequency components at each successive discrete frequency continues until the entire spectrum of the target in a first condition of camouflage, i.e., the uncamouflaged condition, has been sampled.

A memory 28 such as a programmable read only memory (PROM) stores the digital signals representing the spectrum of the target in a first condition. As will be developed further below, a comparison device 30 including a calculator compares the stored digital signals with second digital signals representing the spectrum of the target in a second condition of camouflage to compute a numerical value of the degree of camouflage applied to the target for display on the display device 32 which comprises a plurality of light-emitting diodes (LED's) for example.

OPERATION

Figure 5:
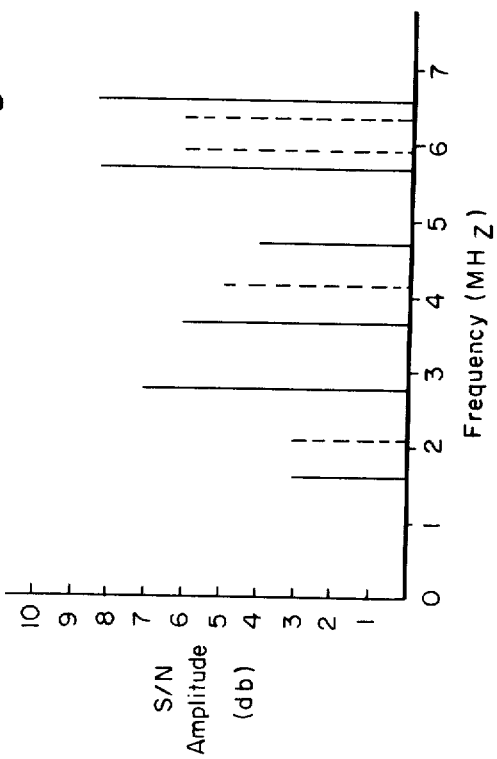
FIG. 5 is a graphical representation of the ideal spectra signal of a target in a second condition of camouflage.

In operation, the DEFT device 6 scans an uncamouflaged target 2 over a range of frequencies in accordance with the sweep oscillator 8. The spectra output of the device is detected by the detector 10 and the analog amplitude signals below a given value are deleted by the clipper circuit 12. The analog signals are digitized and stored in the permanent memory 28 as a reference signal. Next, an unknown degree of camouflage is applied to the target 2. The DEFT device 6 again scans the target, which is now camouflaged, over the range of frequencies determined by the sweep oscillator 8 and the new spectra output is detected by the detector 10. The idealized spectra output of the camouflaged target is shown in FIG. 5. Following digital conversion of the signals representing the camouflaged target, the reference digital signals from the memory are delivered with the digital signals of the camouflaged target to the calculator 30. There, the digital amplitude signals, measured in db, of the camouflaged target are compared with the reference digital amplitude signals, in db, at each discrete frequency of the frequency range selected by the sweep oscillator. The difference between the respective amplitude signals are processed to provide a numerical indication of the degree of camouflage applied to the target. The numerical indication is displayed at the display device 32.

CONTROLLER AND CALCULATOR

Figure 6:
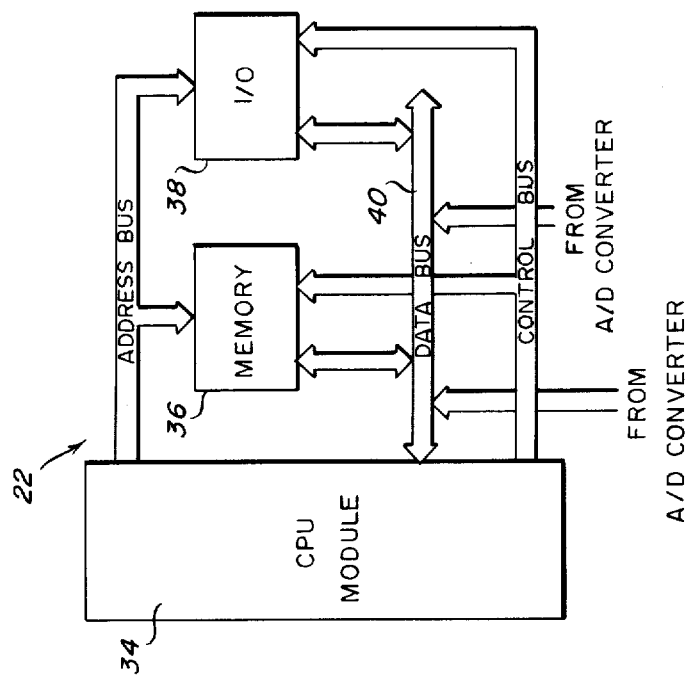
FIG. 6 is a block diagram of the controller.

The controller 22 is shown in more detail in FIG. 6 and comprises a central processing unit 34, a memory 36 and an input/output 38. Control of the gate 16 results from the system timing and interface circuitry of the CPU module 34. The memory 36 includes a programmable read only memory and a read/write memory for program and data storage. In a preferred embodiment, the memory 36 incorporates the aforementioned memory 28. The input/output 38 includes circuitry for connecting the controller 22 with the other components of the camouflage measuring device. Thus, the AD converters 20 and 26 are connected with the data bus 40 of the controller. Similarly, the gate 16 and calculator 30 are also connected with the data bus 40.

In a further embodiment, the controller 22 could be refined to convert the output of the store and refresh device 14 directly into db with software, thereby eliminating the VCO 17, RF voltmeter 18, RF frequency meter 24, and the A/D converters 20 and 26.

In a still further embodiment of the invention, the controller 22 may be further refined to control the sweep oscillator 8, thereby dispensing with the necessity of the store and refresh device 14 and the gate 16. Specifically, CPU 34 through the data bus 40 controls specific operating frequencies of the sweep oscillator, thereby to provide the scanning frequencies to the DEFT device 6. By stepping the sweep oscillator 8 from the lowest scanning frequency to the highest scanning frequency, the controller CPU 34 controls the interval between frequencies during scanning of the target to thereby control the interval between the processing of successive signals corresponding with successive discrete frequencies.

Figure 7:
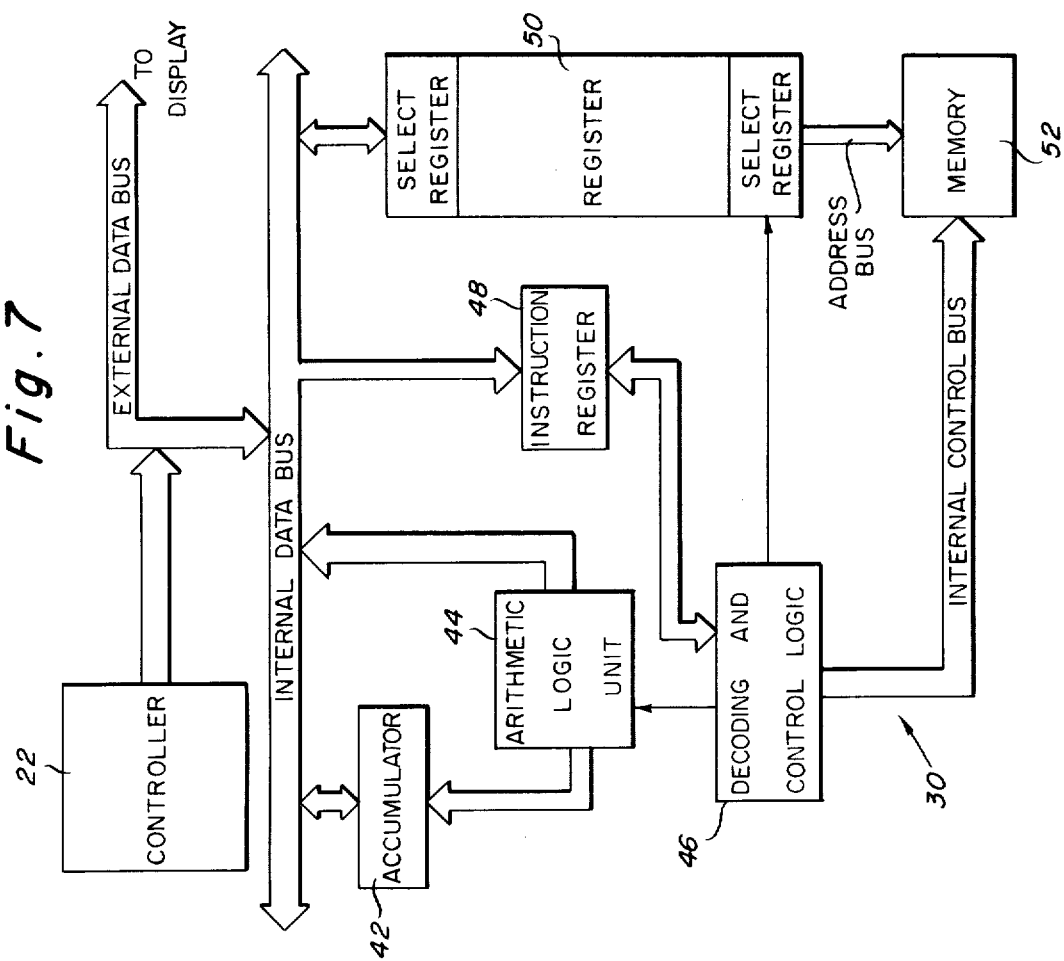
FIG. 7 is a block diagram of the comparison device.

The calculator 30 is shown in greater detail in FIG. 7 and includes a controller such as that shown in FIG. 6, an accumulator 42, an arithmetic logic unit 44, decoding and control logic 46, an instruction register 48, a plurality of select registers 50, and a memory 52. The accumulator 42 and arithmetic logic unit 44 cooperate with the registers to provide the necessary calculations for measuring the degree of camouflage applied to a target. The control logic controls the calculation operations and the memory stores the numerical values indicative of camouflage for display.

While the controller 22, memory 28 and calculator 30 have been described as separate and distinct elements, it will be apparent to those skilled in the art that these components may be combined into a single unit such as for example a microprocessor. Any suitable mircoprocessor hardware hay be used to provide the necessary control and calculations. An example of one such microprocessor device is the Intel 8088.

Referring again to FIGS. 3 and 5, the spectra of a target before and after camouflage, respectively, are shown. The new spectra (FIG. 5) contains additional frequency components indicated by broken lines. These additional components are due to additional spatial frequency information resulting from the camouflage and their amplitudes are used in their entirety. Comparing the idealized spectrum of FIG. 3 with that of FIG. 5, it is noted that one of the original Fourier components in the example, i.e., the first spectral line, is completely eliminated. Thus its amplitude is used in its entirety. Another spectral component, i.e., the third principal component, is actually increased. This also happens to be the third component in the spectrum of the camouflaged object because the first frequency component is eliminated but a new component is added.

The fact that some frequency components can be eliminated and others actually increased is explained by Fourier theory and Fourier analysis since the Fourier series and the Fourier transform involve complex quantities, i.e., they contain a phase term. Thus, the camouflaged object may have some frequency components which are the same as the original object and are either in phase or out of phase with the original frequencies. The result is then an increase in amplitude for in phase signals and a decrease in amplitude for out of phase signals. Furthermore, cancellation of some frequency components may result from completely obscuring a portion of the original object.

The numerical value for the degree of camouflage applied to the target is calculated from the change in the spectra output of the target before and after camouflage is applied. The degree of camouflage may be expressed as the following ratio:

$$C = \Sigma|\Delta(S/N)|/\Sigma(S/N) \text{ before camouflage}$$

where C is the degree of camouflage and $\Delta S/N$ is the change in S/N before and after camouflage is applied. All of the differencing and summing operations are performed in the calculator 30 by the accumulator 42 and the arithmetic logic unit 44. Similarly, the calculator 30 also calculates the degree of camouflage C.

It is important to note that the absolute value of the change in S/N before and after camouflage is applied is used to calculate the degree of camouflage. This is because the application of camouflage results in positive and negative differences in S/N amplitude, all of which must be accounted for. The quantity $\Sigma|\Delta(S/N)|$ has independent significance as a measure of the absolute quantitative change due to camouflage.

Figure 3:
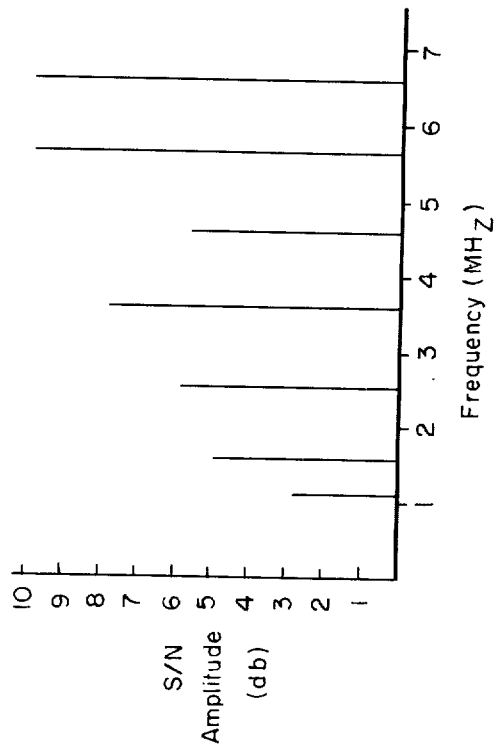
FIG. 3 is a graphical representation of the ideal spectra signal of FIG. 2 having discrete frequencies.
Figure 4:
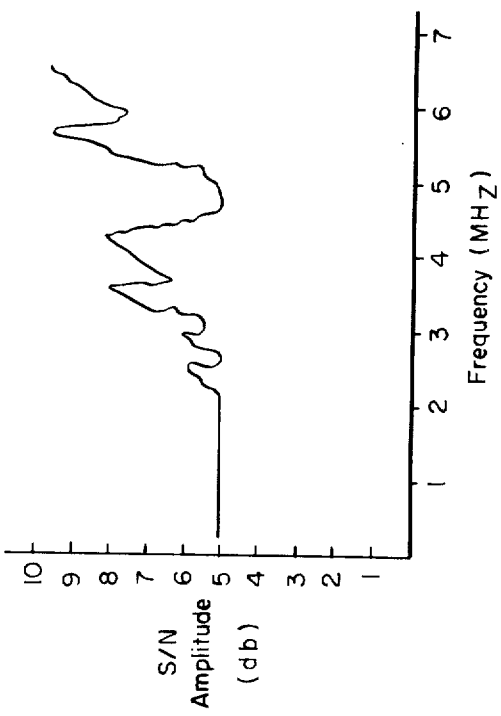
FIG. 4 is a graphical representation of the clipped spectra signal of FIG. 2.

The degree of camouflage applied to a target may be calculated using the example depicted in FIGS. 3 and 5. For the spectrum of the target before camouflage, there are seven principal frequency components whose respective S/N amplitudes are 3, 5, 6, 8, 6, 10, and 10 db. Thus $\Sigma(S/N)$ before is equal to 48 db.

For the spectrum of the object after camouflage (FIG. 5) there are ten principal frequencies of which four are new components. Also, there in one component missing from the spectrum of FIG. 3. The amplitude of the missing component is 3 db and the amplitudes of the new components are 3, 5, 6, and 6 db. The result due to loss or addition of components is therefore 23 db. Examination of the remaining components reveals that the net changes in amplitude for each frequency component are 2, 1, 2, 4, 2, and 2 db, respectively, for a total change at the existing components of 13 db. Thus, the total change of all frequency components (i.e., new, continuing and eliminated components) is $\Sigma|\Delta(S/N)|$ which is equal to 23+13 db or 36 db. Thus where $$C = \Sigma|\Delta(S/N)|/\Sigma(S/N) \text{ before} = 36/48 = 0.75$$

Thus the degree of camouflage applied to the target is 0.75 which when multiplied by 100% equals 75%. This numerical value is calculated by the calculator 30 and displayed by the display 32.

While in accordance with the provisions of the Patent Statutes the preferred forms and embodiments of the invention have been illustrated and described, it will be apparent to those skilled in the art that various changes and modifications may be made without deviating from the inventive concepts set forth above.

What is claimed is:

1. Apparatus for measuring the extent of camouflage applied to a target, comprising
   (a) means responsive to first and second conditions of camouflage of a target for producing spectra signals of first and second limited Fourier transforms, respectively, each of said spectra signals having a plurality of amplitude and principal frequency components;
   (b) base clipper circuit means for deleting from said spectra signals those amplitude components having amplitudes less than a given value;
   (c) means connected with said clipper circuit means for producing amplitude and principal frequency digital signals corresponding with the clipped amplitude and principal frequency components of said first and second spectra signals, respectively; and
   (d) comparison means connected with said digital signal producing means for comparing said first and second amplitude signals at each of said principal frequencies, thereby to indicate the difference between the extent of camouflage of the target in said first and second conditions.

2. Apparatus as defined in claim 1, wherein said digital signal producing means includes
   (1) means including radio-frequency voltmeter means and first analog-to-digital converter means for converting the clipped amplitude signals to digital amplitude signals; and
   (2) means including radio-frequency frequency meter means and second analog-to-digital converter means for converting said principal frequency components to digital frequency signals.

3. Apparatus as defined in claim 2, wherein said comparison means includes calculator means having an arithmetic logic unit for calculating the extent of camouflage.

4. Apparatus as defined in claim 3, wherein said digital signal producing means further includes
   (3) first memory means (14) for storing said spectra signals;
   (4) gate means (16) for controlling the output of said second storage means to deliver successive ones of said spectra signals to said radio frequency voltmeter and said radio frequency frequency meter, respectively; and
   (5) control means (22) for activating said gate means following digital amplitude and frequency processing of a previous one of said spectra signals to deliver a subsequent one of said spectra signals for digital amplitude and frequency processing.

5. Apparatus as defined in claim 4, wherein said digital signal producing means further includes
   (6) second memory means (28) connected with said control means for storing said first and second digital amplitude and principal frequency signals, the output of said second memory means being connected with said comparison means.

6. Apparatus as defined in claim 5, wherein said spectra signal producing means comprises
   (1) direct electronic Fourier transform generating means operable to scan the target;
   (2) sweep oscillator means for providing a range of limited scanning frequencies to said direct electronic Fourier transform means; and
   (3) synchronous detector means for detecting said spectra signals from said direct electronic Fourier transform means, thereby to produce a limited spectra output of the target.

7. Apparatus as defined in claim 2, and further comprising display means connected with said comparison means for visually displaying the extent of camouflage applied to a target.

8. A method for measuring the extent of camouflage applied to a target, comprising the steps of
   (a) producing first and second spectra signals of Fourier transforms from first and second conditions of camouflage of a target, respectively, each of said spectra signals having a plurality of amplitude and principal frequency components;
   (b) deleting said spectra signal amplitude components less than a given value;
   (c) producing amplitude and principal frequency digital signals corresponding with the amplitude and principal frequency components of said first and second spectra signals, respectively;
   (d) storing said first and second digital amplitude and principal frequency signals; and
   (e) comparing said first and second amplitude signals at each of said principal frequencies, thereby to indicate the difference between the extent of camouflage of the target in said first and second conditions.

* * * * *